United States Patent [19]

Yamane et al.

[11] Patent Number: 5,766,595
[45] Date of Patent: Jun. 16, 1998

[54] METHOD OF IMPROVING QUALITY OF EGGS BY FEEDING TEA POLYPHENOL

[75] Inventors: Tetsuo Yamane, Yokohama; Takao Tsuchida, Tsuchiura; Hisaya Gotou, Tomobe-machi; Daizou Takahashi; Hidetsugu Takeda, both of Kamisu-mach, all of Japan

[73] Assignees: Nippon Formula Feed Mfg. Co., Ltd., Yokohama; Mitsui Norin Co., Ltd., Tokyo, both of Japan

[21] Appl. No.: 593,853

[22] Filed: Jan. 30, 1996

[30] Foreign Application Priority Data

Jan. 31, 1995 [JP] Japan ............... 7-014239
Sep. 8, 1995 [JP] Japan ............... 7-231462

[51] Int. Cl.$^6$ .................. A01N 65/00; A01K 45/00
[52] U.S. Cl. ................... 424/195.1; 119/6.8; 514/456
[58] Field of Search ............... 424/195.1; 514/456; 119/6.8

[56] References Cited

FOREIGN PATENT DOCUMENTS

WO-A-95
01104  12/1995  WIPO.

OTHER PUBLICATIONS

T. Sreenivasa Reddy, "Use of Non-Conventional Feed Items in Poultry Rations, Their effect on Growth and Egg Production", Poultry Advisor, vol. 20, No. 1, 1987, pp. 33–36, XP002001387.

Database WPI, Week 7748, Derwent Publications Ltd., London, GB, AN 77-86199Y, XP002001388 of SU-A-552 066 (Geor Mixed Feed Ind.), 22 Apr. 1977.

Patent Abstracts of Japan, vol. 18, No. 571 (C-1267), 2 Nov. 1994 of JP-A-06 209720 (Nippon Haigou Shiryo KK), 2 Aug. 1994.

Primary Examiner—Sandy Saucier
Attorney, Agent, or Firm—Frishauf, Holtz, Goodman, Langer & Chick, P.C.

[57] ABSTRACT

Method of improving the quality of an egg from a female adult fowl comprising adding an effective egg improving amount of at least one tea polyphenol to a feed composition for the fowl and administering the composition to the fowl. Eggs produced by such method have a reduced crude fat content, a reduced peroxide content, an enhanced Haugh Unit value, an enhanced degree of transparency of egg white, an enhanced foam-forming ability and a pure white color in foam and egg white when the eggs are cooked. Also provided is an improved feed composition for improving the quality of an egg from a female adult fowl, wherein the improvement comprises the feed composition containing an effective egg improving amount of at least one tea polyphenol.

4 Claims, 1 Drawing Sheet

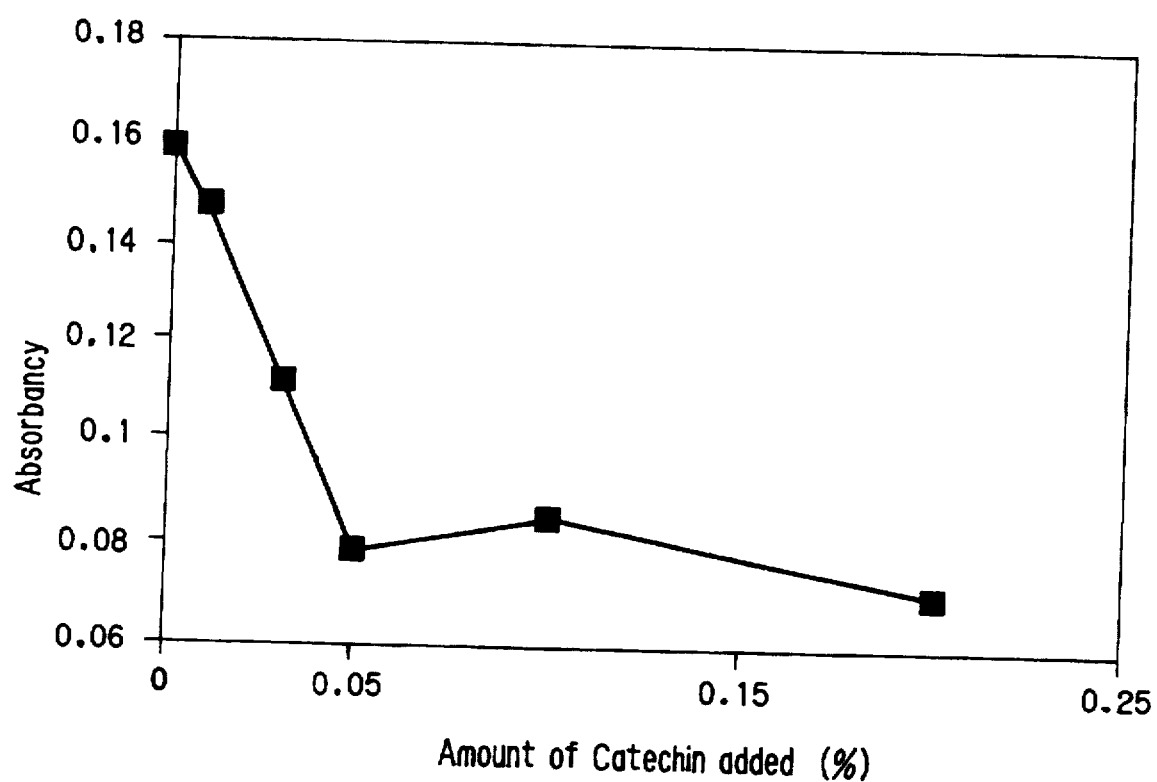
FIGURE

METHOD OF IMPROVING QUALITY OF EGGS BY FEEDING TEA POLYPHENOL

FIELD OF THE INVENTION

The present invention relates to a method of improving quality of domestic fowl eggs and the use of a feed which improves the quality of domestic fowl eggs.

BACKGROUND INFORMATION

Polyphenols are contained in green tea, black tea and oolong tea. Human and animal experiments have proven that tea catechins, the main components in the polyphenolic fraction, possess blood pressure lowering action, inhibition of fat absorption, and anti-oxidative action in vivo; among other actions.

However, up until now there have been no reports which show beneficial effects when tea polyphenols are mixed in the feed of domestic animals or fowls, and likewise there have been no reports which show improvements in the composition of eggs brought about by the use of tea polyphenols.

Eggs are well-known for their high nutritional value. However, it is unfortunate that people concerned about the possibility of various ailments which often occur as the body ages, are avoiding eating eggs. With these points in mind, the present inventors undertook extensive research to produce an egg with reduced fat content and a low level of peroxides.

As ingredients for cakes and confectionery, eggs which beat up well and have pure white color of egg white are desirable. Usually the egg white of an egg has a yellowy tinge and the beaten egg too, retains this coloring. With some kinds of confectionery this coloring is undesirable and so a whitening agent is sometimes used. We recognized there was a demand to produce eggs with pure white color and which did not require the use of a whitening agent.

SUMMARY OF THE INVENTION

The present invention provides a method of improving the quality of an egg from a female adult fowl comprising adding an effective egg improving amount of at least one tea polyphenol to a feed composition for the fowl and feeding said feed composition to the fowl and also an improved feed composition for improving the quality of an egg from a female adult fowl, wherein the improvement comprises said feed composition containing an effective egg improving amount of at least one tea polyphenol.

In the present invention we mixed a compound containing tea polyphenols (trade name : Polyphenon, product of Mitsui Norin Co., Ltd.) into feed for a regular domestic fowl, and according to the consumption of this feed, eggs produced had an improved Haugh Unit (HU) value, and thus an increased commercial value; a decreased content of crude fats, thus being healthier; and a decreased content of peroxides, thus preserving the freshness.

These eggs were not only tastier, but healthier, and furthermore had near transparent egg whites, while the beaten egg had superior foam formation which was pure white in color. In particular the decrease in peroxides was due to the antioxidative action of catechins.

BRIEF DESCRIPTION OF THE FIGURE

The Figure is a graph which shows the effect of catechin content in the feed on the color of the egg white.

DETAILED DESCRIPTION OF THE PEFERRED EMBODIMENTS

Since the eggs from white and brown strain hens of the present invention are fresh produce, there are variations in the HU value, the content of crude fats, and the concentration of peroxides in the yolk, but for example HU in all seasons apart from summer, a 2 day-old egg showed improvement of about 6%, from HU 80 to HU 85, and the content of crude fats in the yolk decreased by 13%, from 35% to 30% and the amount of peroxides decreased by about 18%, from 65 nano-mol/g to 53 nano-mol/g. Also the whites of the eggs of the present invention have a high degree of transparency and are pure white when cooked.

According to the present invention, the eggs have the following characteristics: the egg having an egg yolk with a crude fat content of 25 to 35%; a peroxide content of the egg yolk of 48 to 58 nano-mol/g; a height of the egg yolk in Haugh Units of 79 to 93, based on an egg laid during a season other than summer, for a two-day old egg from hens 300 days old; the height of the egg laid during the summer being 70 to 85 Haugh Units; the egg having an absorbancy measured by visible rays of 0. 15 to 0.03 ; the egg white having a color of N9.5 to N9.0 on the Munsell color system after cooking at a temperature of from 90 to 100° C. for 30 minutes.

The crude fat content of the egg yolk is obtained by a method described in Standard Methods of Analysis for Hygienic Chemists (1990 Japan), item 2.1.4.1 Extraction with a mixture solution of chloroform and methanol, and the peroxide content of the egg yolk is obtained by a method described in Standard Methods of Analysis for Hygienic Chemists(1990 Japan), item 2.1.4.4(4) thiobarbituric value.

The tea polyphenol component as referred to in the present invention, could be from green tea, black tea, oolong tea; or a polyphenol extracted from green tea, black tea or oolong tea or the dregs from an extraction thereof; or instant tea products, an extraction or dregs thereof, that is to say, crude catechins; but it is not limited to these substances, it could be any plant material containing polyphenols.

Green tea and black tea refer to all green, oolong and black tea of the botanical name Camellia sinensis; a large leaf (Assam), a small leaf (Chinese), and varieties with a middle-sized leaf (hybrids).

Tea polyphenol compounds include the tea catechin compounds represented by the general formula(I) given below and the theaflavin compounds represented by the general formula(II) given below, and also thearubigin:

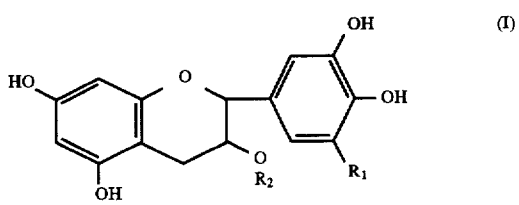
(I)

in which $R_1$ is a hydrogen atom or a hydroxy group and $R_2$ is a hydrogen atom or a 3,4,5-trihydroxybenzoyl group; and

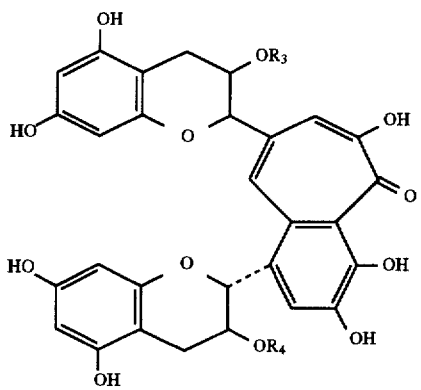

(II)

in which $R_3$ and $R_4$ are, each independently from the other, a hydrogen atom or a 3,4,5-trihydroxybenzoyl group.

Particular examples of the tea catechin compounds represented by the general formula(I) include: (+)-catechin, (−)-epicatechin, which is a compound of the formula(I) with $R_2$=H and $R_2$=H; (−)-epigallocatechin, which is a compound of the formula(I) with $R_1$=OH and $R_2$=H; (−)-epicatechin gallate, which is a compound of the formula(I) with $R_1$=H and $R_2$=3,4,5-trihydroxybenzoyl group; and (−)-epigallocatechin gallate, which is a compound of the formula(I) with $R_1$=OH and $R_2$=3,4,5-trihydroxybenzoyl group. Particular examples of the theaflavin compounds include: free theaflavin, which is a compound of the formula (II) with $R_3$=H and $R_4$=H; theaflavin monogallate A, which is a compound of the formula(II) with $R_3$=3,4,5-trihydroxybenzoyl group and $R_4$=H; theaflavin monogallate B, which is a compound of the formula(II) with $R_3$=H and $R_4$=3, 4,5-trihydroxybenzoyl group; and theaflavin digallate, which is a compound of the formula(II) with $R_3$=3,4,5-trihydroxybenzoyl group and $R_4$=3,4,5-trihydroxybenzoyl group.

The above described tea polyphenol compounds can be prepared from tea leaves as the starting material and a method for the preparation thereof and a typical example of the product composition are described, for example, in Japanese Patent Kokai 59-219384, 60-13780 and 61-130285, etc.

The composition of typical tea polyphenols are shown below. Polyphenon 100 (trade name, product of Mitsui Norin Co., Ltd.): (+) -gallocatechin 1.44%, (−)-epicatechin 5.81%, (−)-epigallocatechin 17.57%, and (−)-epicatechin gallate 12.51%, (−)-epigallocatechin gallate 53.9%; Polyphenon E (trade name, product of Mitsui Norin Co., Ltd.): (−) -epicatechin 10.8%, (−)-epigallocatechin 9.2%, (−)-epicatechin gallate 6. 5%, and (−)-epigallocatechin gallate 54.8%, (−)-gallocatechin gallate 4.0%.

The amount of the tea polyphenol in the feed is 0.001 to 0.5 wt. % calculated as a catechin; and 0.01 to 10 wt. % as a green tea, black tea or oolong tea, and 0.2 to 30 wt. % as tea dregs.

The period of feeding of the feed to the domestic fowls varies with the amount of tea polyphenol in the feed, but feeding should be continued for more than 7 days, preferably 7 to 14 days in case of the content of catechin is 0.2% and more than 10 days, preferably 10 to 21 days in case of the content of catechin is 0.01%.

The following effects can be obtained by the method of the present invention.

1. The height of the yolk improved.

Using the method which measures the quality of the egg (expressed as Haugh Unit), when the average HU value is around 81, according to the method of the present invention, this value improved to around 86 (an improvement of about 6%). Eggs which have a high HU value have a thick albumin and the height of the yolk is high.

The Haugh Unit may fluctuate according to the strains and variety of hens, the age of the hens, the feed, the season and the age of the egg, but according to the method of the present invention, in all seasons apart from the summer, a two day old egg from hens around 300 days old which generally had a value around 74–88 (average 81) improved to a value of 79–93 (average 86), and in the summer the improvement was from a value of 66–80 (average 73) to a value of 70–85 (average 77).

Calculation of HU is as follows:
HU=100.log (H-1. 7W$^{0.37}$ +7.6)
H=Thickness of the Albumin (mm)
W=Weight of Egg
HU=A unit of measure which indicates the degree of deterioration of the egg by reference to changes in the thickness of the albumin and weight of the egg. When the height of the albumin and yolk are high, the commercial value of the egg increases.

2. An egg with a 13% decrease in crude fat content and a lighter taste was produced.

Normally the crude fat content in the yolks of chicken eggs is about 25–38%, but according to the method of present invention when the crude fat content was 35%, it was decreased to about 30% (a decrease of about 13%). This resulted in an egg with a lighter taste. Moreover, for those who are sick or those concerned about an excess fat intake, these eggs are a healthier alternative to regular eggs.

The reason for the reduced crude fat content is that tea catechins inhibit the absorption of fats into the body.

3. Reduction in the peroxide content of the egg yolk.

Peroxides are produced when fat in the cells is oxidised. Active oxygen is continuously produced in the cells and this causes the production of peroxides. As people age, production of the enzyme which inhibits oxidation is impeded, so peroxides accumulate in the cells and this is one of the main causes of Alzheimer's disease.

The intake of catechins according to the method of the present invention results in a statistically significant decrease in peroxides in the yolks. Normally the peroxide content in the yolk of chicken eggs is about 65 nano-mol/g but with feeding of 0.2% catechin the content of peroxides in the yolk decreased to 53 nano-mol/g (about an 18% reduction). The reduction of peroxides in the yolk of eggs with catechin feeding is due to the antioxidative action of tea catechins in vivo. When the content of peroxides in the egg yolk is low, the eggs keep for longer and moreover they are healthier.

4. The egg white has a high level of transparency and turns pure white when cooked, thus increasing its value as an ingredient in commercial products.

As described hereinbefore, the above crude fat content of the egg yolk is obtained by a method described in Standard Methods of Analysis for Hygienic Chemists (1990 Japan), item 2.1.4.1 Extraction with a mixture solution of chloroform and methanol, and the above peroxide content of the egg yolk is obtained by a method described in Standard Methods of Analysis for Hygienic Chemists(1990 Japan), item 2.1.4.4(4) thiobarbituric value.

The present invention will now be described in detail with reference to the following examples that by no means limit the scope of the invention.

EXAMPLE 1

A dried green tea extract (catechin content: 30%) was added to the regular feed for layers in a concentration of 0.17–0.7 wt. % (0.05–0.2% as catechin) and fed to layers (groups of 50; a total number of 250) for 7 weeks from Sep. 5th, 1994. The results showed that as the percentage of catechin added was increased there was a tendency for the food intake, the number of eggs laid and the strength of the shell to decrease but the HU value showed an improvement. There was no effect on the color of the egg yolk or the thickness of the shell of the egg.

At a concentration of 0.05% there was no detrimental influence on food intake, the number of eggs laid or the strength of the shell and furthermore the HU value showed an improvement. The results are shown in the following tables.

TABLE 1

Effects of Tea Catechin Feeding on Egg Production

|  | Control | Group 1 (Catechin 0.05%) | Group 2 (Catechin 0.1%) | Group 3 Catechin 0.15%) | Group 4 (Catechin 0.2%) |
| --- | --- | --- | --- | --- | --- |
| Rate of survival (%) | 100.0 | 100.0 | 100.0 | 97.5 | 92.5 |
| Rate of Laying (%) | 79.9 c | 77.5 c | 66.5 bc | 52.2 ab | 40.2 a |
| Weight of Egg (g) | 67.5 c | 66.1 ab | 66.8 bc | 65.4 a | 66.2 abc |
| Average Weight of Egg/Day (g) | 53.9 c | 51.3 c | 44.5 bc | 34.1 ab | 26.6 a |
| Rate of Food Intake (g) | 122 c | 118 c | 109 b | 94 a | 90 a |
| Feed Efficiency | 2.27 a | 2.31 a | 2.51 a | 2.92 ab | 4.27 b |

*Average of 20 eggs in each group. Statistically significant difference shown by differences between letters ($P < 0.05$)

TABLE 2

Effects of Tea Catechin Feeding on Egg Quality

|  | Control | Group 1 | Group 2 | Group 3 | Group 4 |
| --- | --- | --- | --- | --- | --- |
| Weight of Egg (g) | 69.1 b | 66.4 ab | 66.2 ab | 65.1 a | 63.9 a |
| HU | 81.9 a | 85.8 bc | 83.0 ab | 84.2 ab | 88.7 c |
| Strength of Shell (kg/cm$^2$) | 2.74 a | 2.76 a | 2.55 a | 2.83 a | 2.59 a |
| Thickness of Shell (mm) | 0.376 a | 0.372 a | 0.368 a | 0.374 a | 0.367 a |
| Yolk Color Fan Score (Roche, 1993) | 10.4 b | 10.4 b | 10.5 b | 9.85 a | 10.2 ab |

It was confirmed that the fat content in the yolk of eggs of chickens fed tea catechins showed a statistically significant decrease as compared with the control.

| Control Group | 37.3%$^a$ ± 2.22 |
| --- | --- |
| 0.05% Group | 33.6%$^b$ ± 1.77 |
| 0.1% Group | 34.3%$^b$ ± 0.82 |
| 0.2% Group | 32.8%$^b$ ± 1.74 |

There was a statistically significant decrease in the amount of peroxides in the yolks of eggs of chickens fed tea catechins (nmol/g egg).

| Control Group | 64.93$^a$ ± 2.59 |
| --- | --- |
| 0.05% Group | 54.66$^b$ ± 4.14 |
| 0.1% Group | 52.40$^b$ ± 3.08 |
| 0.2% Group | 53.04$^b$ ± 3.33 |

Results of a sensory test with the eggs from chickens fed on tea catechins showed that 80% of the panel (20 people) noticed a difference in the taste as compared with the control, and 75% thought the eggs from the catechin-fed chickens tasted better.

| Difference in taste of raw egg between the control group and the test group | |
| --- | --- |
| No difference | 20.0% (4/20) |
| Difference Noted | 80.0% (16/20) |
| Preference | |
| Preferred the control group | 0.0% |
| Preferred the test group | 75.0% (15/20) |
| No preference | 25.0% (5/20) |

EXAMPLE 2

A green tea extract (catechin content: 30%) was added to regular chicken feed in a concentration of 0.01–0.05% and fed to laying chicks (each group consisting of 50 chicks, and a total of 200) for a period of 7 weeks starting from 16th Nov. 1994. Results (Tables 3 and 4) showed there were no noticeable differences in food intake, rate of laying, strength of the shell among the groups while the HU value increased as the catechin concentration was increased.

TABLE 3

|  | Control | Group 1 (Catechin 0.01%) | Group 2 (Catechin 0.03%) | Group 3 (Catechin 0.05%) |
| --- | --- | --- | --- | --- |
| Rate of survival (%) | 100.0 | 100.0 | 100.0 | 100.0 |
| Rate of Laying (%) | 81.0 | 81.3 | 79.0 | 82.0 |
| Weight of Egg (g) | 66.8 | 67.5 | 67.1 | 66.5 |
| Average weight of Egg/Day (g) | 54.1 | 54.8 | 53.0 | 54.5 |
| Food Intake (g) | 125 | 126 | 123 | 124 |
| Feed Efficiency | 2.31 | 2.30 | 2.32 | 2.27 |

TABLE 4

|  | Control | Group 1 | Group 2 | Group 3 |
|---|---|---|---|---|
| Weight of Egg (g) | 68.5 | 67.6 | 67.8 | 68.2 |
| HU | 80.8 | 82.9 | 83.5 | 84.8 |
| Strength of Shell (kg/cm$^2$) | 2.76 | 2.76 | 2.71 | 2.72 |
| Thickness of Shell (mm) | 0.378 | 0.372 | 0.376 | 0.375 |

The content of crude fats in the yolks of eggs of chickens fed tea catechins decreased as compared with the control.

| Control | 35.8$^a$ ± 2.16 |
|---|---|
| 0.01% Group | 33.5$^{ab}$ ± 2.05 |
| 0.03% Group | 32.1$^{ab}$ ± 1.26 |
| 0.05% Group | 31.5$^b$ ± 1.61 |

The peroxide content in the yolks of eggs of chickens fed tea catechins showed a statistically significant decrease as compared with the control (nmol/g yolk).

| Control | 65.3$^a$ ± 2.18 |
|---|---|
| 0.01% Group | 57.5$^{ab}$ ± 2.51 |
| 0.03% Group | 55.1$^b$ ± 3.09 |
| 0.05% Group | 52.8$^b$ ± 3.41 |

Commercial green tea leaves at concentrations of 0.5, 1.0, 3.0% and black tea leaves at a concentration of 1.0% were added to the feed and fed to laying chicks (50 in each group, a total number of 150) for a period of 7 weeks starting from 4th May 1994. These results (Tables 5 and 6) showed that as the green tea concentration increased the HU value improved. There was some decrease of the laying rate in the group with the addition of 1.0% green tea leaf.

The HU value improved as the tea catechin concentration increased. There was some decrease in the strength of the shell in the 1.0% green tea leaf group.

The content of crude fats in the yolks of eggs of chickens fed a diet containing green tea leaves showed a statistically significant decrease as compared with the control.

| Control | 33.9$^a$% ± 1.89 |
|---|---|
| Green tea 0.5% Group | 30.8$^{ab}$% ± 2.21 |
| Green tea 1.0% Group | 29.7$^b$% ± 2.82 |
| Green tea 3.0% Group | 26.5$^b$% ± 0.89 |
| Black tea 1.0% Group | 30.1% ± 1.58 |

The content of peroxides in the yolks of eggs of chickens fed a diet containing green tea leaves showed a statistically significant decrease (nmol/g egg).

| Control | 65.5$^a$ ± 2.44 |
|---|---|
| Green tea 0.5% Group | 58.0$^b$ ± 2.91 |
| Green tea 1.0% Group | 53.1$^b$ ± 3.55 |
| Green tea 3.0% Group | 51.0$^b$ ± 3.41 |
| Black tea 1.0% Group | 52.7 ± 2.18 |

EXAMPLE 4

The dried dregs from green tea infusion (5%) and black tea infusion (3%) were added to the feed and fed to laying hens (50 hens in each group, a total of 150) for a period of 7 weeks from 3rd Dec. 1994. The green tea and black tea infusion dregs were obtained from a liquid tea bottling factory and the catechin content was 4.1% and 7.0%, respectively.

TABLE 5

|  | Control | Group 1 (Green tea 0.5%) | Group 2 (Green tea 1.0%) | Group 3 (Green tea 3.0%) | Group 4 (Black tea 1.0%) |
|---|---|---|---|---|---|
| Rate of Survival (%) | 100.0 | 100.0 | 100.0 | 100.0 | 100.0 |
| Rate of Laying (%) | 76.7 | 77.5 | 69.8 | 45.0 | 71.5 |
| Weight of Egg (g) | 65.8 | 66.1 | 66.3 | 64.1 | 65.7 |
| Average weight of Egg/Day (g) | 50.4 | 51.2 | 46.2 | 28.9 | 47.0 |
| Food Intake (g) | 128 | 130 | 115 | 88 | 118 |
| Feed Efficiency | 2.54 | 2.54 | 2.49 | 3.04 | 2.51 |

TABLE 6

Effects of Feeding of Green Tea Leaf on Egg Quality

|  | Control | Group 1 (Green tea 0.5%) | Group 2 (Green tea 1.0%) | Group 3 (Green tea 3.0%) | Group 4 (Black tea 1.0%) |
|---|---|---|---|---|---|
| Weight of Egg (g) | 67.5 | 67.9 | 68.3 | 63.3 | 67.5 |
| HU | 80.5 | 83.9 | 85.2 | 86.1 | 86.1 |
| Strength of Shell (kg/cm$^2$) | 2.69 | 2.72 | 2.61 | 2.45 | 2.65 |
| Thickness of Shell (mm) | 0.368 | 0.368 | 0.361 | 0.355 | 0.364 |

TABLE 7

Effects of Feeding of Green Tea and Black Tea Dregs on Laying

|  | Control | Group 1 (Green tea dregs 5%) | Group 2 (Black tea dregs 3%) |
| --- | --- | --- | --- |
| Rate of Survival (%) | 100.0 | 98.0 | 100.0 |
| Rate of Laying (%) | 82.0 | 80.1 | 81.5 |
| Weight of Egg (g) | 65.5 | 64.7 | 65.0 |
| Average weight of Egg/Day (g) | 53.7 | 51.8 | 53.0 |
| Food Intake (g) | 119 | 117 | 115 |
| Feed Efficiency | 2.22 | 2.26 | 2.17 |

TABLE 8

Effects of Feeding of Green Tea and Black Tea Dregs on Egg Quality

|  | Control | Group 1 (Green tea dregs 5%) | Group 2 (Black tea dregs 3%) |
| --- | --- | --- | --- |
| Weight of Egg (g) | 64.8 | 65.1 | 64.5 |
| HU | 82.0 | 87.9 | 89.2 |
| Strength of Shell (kg/cm$^2$) | 2.70 | 2.69 | 2.71 |
| Thickness of Shell (mm) | 0.368 | 0.370 | 0.365 |

The content of crude fats in yolks of eggs of hens fed a diet containing the dregs from extractions of green and black teas showed a statistically significant decrease (nmol/g).

| Control | 36.8$^a$% ± 2.14 |
| --- | --- |
| Green tea dregs (5%) | 32.9$^b$% ± 2.55 |
| Black tea dregs (3%) | 32.1$^b$% ± 1.81 |

The content of peroxides in yolks of chicks fed a diet containing the dregs from extractions of green and black teas showed a statistically significant decrease (nmol/g).

| Control | 63.33$^a$ ± 2.65 |
| --- | --- |
| Green tea dregs (5%) | 52.99$^b$ ± 3.01 |
| Black tea dregs (3%) | 54.25$^b$ ± 4.53 |

EXAMPLE 5

A dried green tea extract (catechin content 30%) was added to regular layer feed in a concentration of 0–0.2% and fed for a period of two weeks (Layers: Boris brown 26 weeks old, 1 group 50 chickens, total 300). Eggs laid were broken open and the degree of transparency was measured. Results are as shown in Table 9 and FIG. 1. (Measurement of Transparency)

Water-soluble egg white was poured into a 1 cm$^2$ glass cell for measuring absorbance (Optical Density), taking care no air bubbles were included and the absorbance was measured with distilled water as a control.

TABLE 9

| Amount of catechin in feed | Absorbance |
| --- | --- |
| Control | 0.158 |
| 0.01% | 0.148 |
| 0.03% | 0.112 |
| 0.05% | 0.079 |
| 0.1% | 0.086 |
| 0.2% | 0.071 |

As can be seen from Table 9 and FIG. 1, the degree of transparency of the egg white increased with the amount of tea catechin added. With a concentration of over 0.1% the beaten egg white was pure white in color. The wave-length 440nm which shows a yellow color was used.

EXAMPLE 6

10 eggs from each group (control group and catechin 0.2% group) of Example 5 were boiled and the cooked egg white was obtained. The egg white of the 0.2% catechin group was pure white in color compared with the control group which had a yellowy tinge. When measured using the Munsell color system (JIS Z8721) the color of the control group was measured as 5Y8/2 while the catechin 0.2% group was measured as N9.5. The color of the cooked white of the 0.05% and 0.01% catechin groups was the same as the 0.2% group.

What is claimed is:

1. A method of improving the quality of eggs from a female adult fowl comprising adding an effective egg improving amount of at least one tea polyphenol to a feed composition for the fowl, said amount of said at least one tea polyphenlol in said fend being 0.001 to 0.5 wt. %, calculated as a catechin, feeding said feed composition to the fowl, and collecting the eggs whereby eggs from the fowl have a reduced crude fat content, a reduced peroxide content, an enhanced Haugh unit value, an enhanced degree of transparency of egg white, an enhanced foam-forming ability, a pure white color when the eggs are beaten to form a foam and a pure white color egg white when the eggs are cooked.

2. The method according to claim 1, wherein the tea polyphenol is from a tea selected from the group consisting of green tea, black tea and oolong tea; or a tea polyphenol extracted from a tea selected from the group consisting of green tea, black tea and oolong tea or dregs thereof; or an instant tea product, an extraction or dregs thereof.

3. The method according to claim 1, wherein the tea polyphenol is at least one compound selected from the group consisting of (+)-catechin, (−)-epicatechin, (−)-epigallocatechin, (−)-epicatechin gallate, (−)-epigallocatechin gallate, free theaflavin, theaflavin monogallate A, theaflavin monogallate B and theaflavin digallate.

4. The method according to claim 3, wherein the tea polyphenol is at least one catechin in an amount of 0.05 to 0.2 wt %.

* * * * *

UNITED STATES PATENT AND TRADEMARK OFFICE
CERTIFICATE OF CORRECTION

PATENT NO. : 5,766,595  
DATED : June 16, 1998  
INVENTOR(S) : Tetsuo Yamane et al.

It is certified that error appears in the above-identified patent and that said Letters Patent is hereby corrected as shown below:

Column 10, claim 1,  
Line 37, replace "fend" with -- feed --.

Signed and Sealed this

Twelfth Day of March, 2002

Attest:

Attesting Officer

JAMES E. ROGAN  
*Director of the United States Patent and Trademark Office*